Patented Sept. 21, 1937

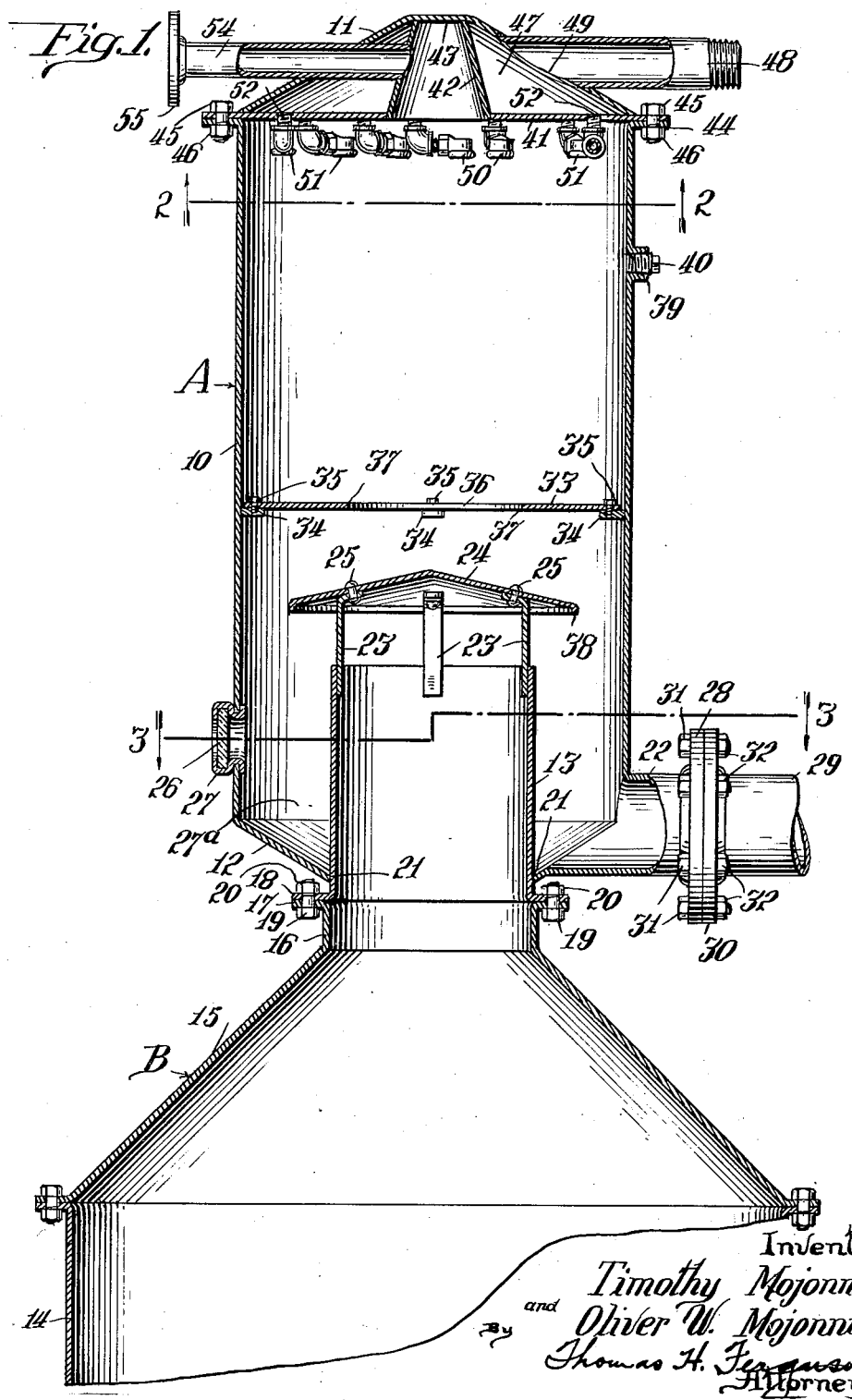

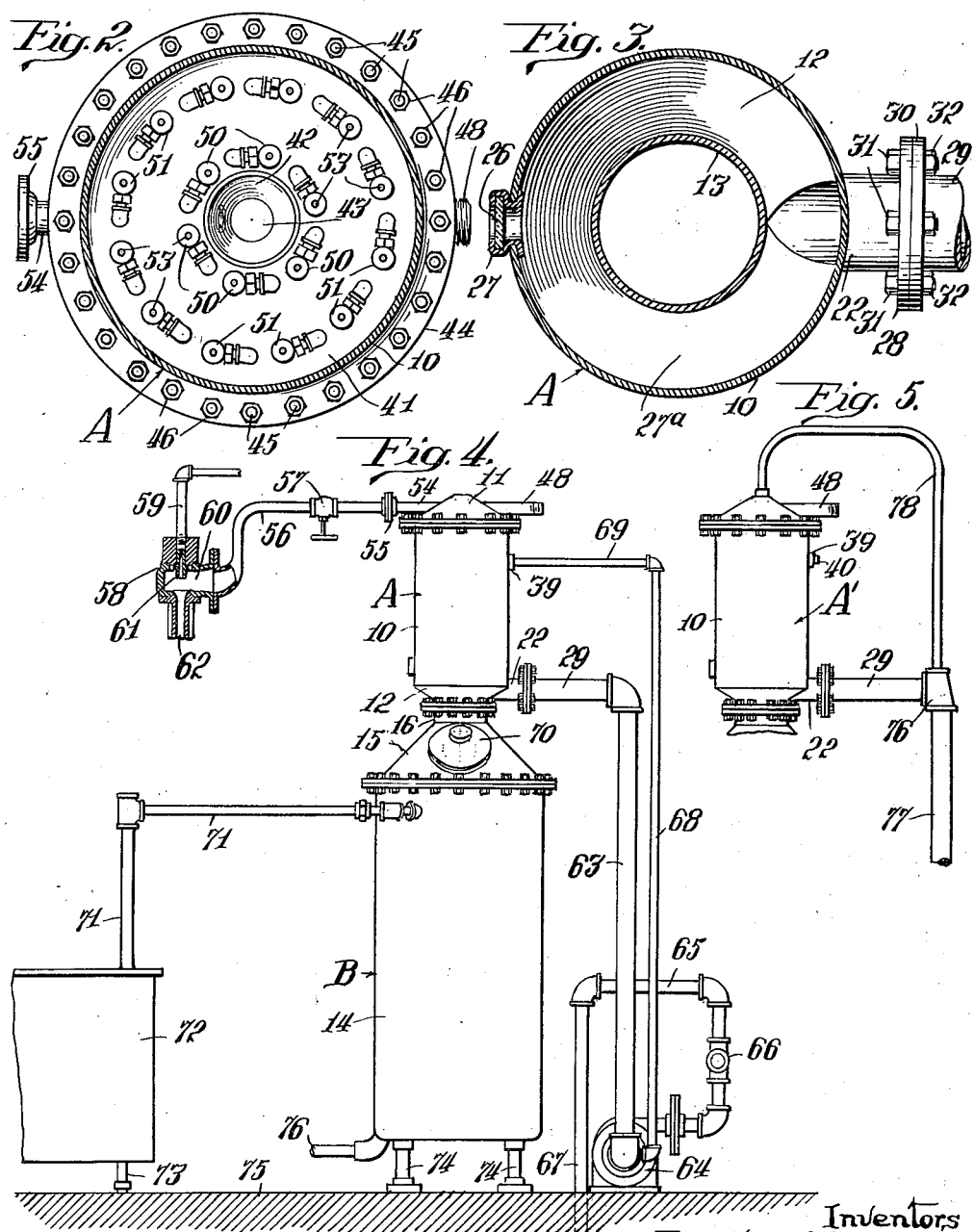

2,093,895

UNITED STATES PATENT OFFICE 2,093,895

CONDENSER

Timothy Mojonnier, Oak Park, and Oliver W. Mojonnier, River Forest, Ill., assignors to Mojonnier Bros. Co., a corporation of Illinois Application February 8, 1936, Serial No. 62,908

5 Claims. (Cl. 261—117)

The present invention relates to condensers and more particularly condensers for treating vapors from vacuum pans and the like.

The principal object of the invention is to produce a condenser that will be efficient in operation, economical to manufacture and durable in service.

The various objects and advantages of the invention will be best understood upon reference to the following detailed description taken in connection with the accompanying drawings while the scope of the invention will be particularly pointed out in the appended claims.

In said drawings, Fig. 1 is a central sectional elevation of the upper portion of a vacuum pan and a connected condenser constructed and arranged in accordance with the present invention; Fig. 2 is a horizontal section through the upper portion of the condenser illustrating particularly the arrangement of the spraying devices, the plane of section being indicated by the line 2—2 of Fig. 1; Fig. 3 is a similar section taken near the bottom of the condenser, the plane of section being indicated by the line 3—3 of Fig. 1; Fig. 4 is a general view, more or less diagrammatic, illustrating a vacuum pan and the novel condenser in connection with associated supply tank, aspirator and pump, all arranged to illustrate one use of the condenser; and Fig. 5 is a similar view of a modified condenser and connections. Throughout these views like characters refer to like parts.

Referring to the drawings in detail, A designates one embodiment of the novel condenser and B designates an associated vacuum pan. The condenser in the present instance has an enclosing casing consisting of an outer cylindrical wall 10, a conically shaped top 11 and a bottom 12 also conical in form. The bottom 12 has a large central opening through which extends a cylindrical flue 13. The vacuum pan in the present instance also has a cylindrical wall 14 and a conical top 15. The top 15 terminates in a short cylindrical portion 16 and the latter has an outwardly extending flange 17. Cooperating with the flange 17 is a flange 18 located at the lower end of the flue 13. The two flanges 17 and 18 are suitably apertured for the passage of retaining bolts 19 provided with suitable nuts 20. Obviously the inclined bottom 12 of the condenser casing is secured to the outer wall of the flue 13. In the present instance this connection is made by a welded joint along the circumferential meeting line indicated by the numerals 21. The inclined bottom 12 and the adjacent portion of the cylindrical wall 10 are also connected to a short length of pipe 22. This connection is also preferably a welded connection.

The flue 13 is provided with a series of upwardly extending legs 23 which are inclined at their upper ends and such inclined portions are connected to a cowl-like baffle plate 24 which is thus spaced from the upper end of the flue. In this instance the lower ends of the legs 23 are secured to the upper end of the flue 13, preferably by welding. In contrast to this, the inclined portions at the upper ends of the legs are connected to the plate 24 by rivets 25. For convenience in inspecting the interior of the casing 10 at a point adjacent to the flue 13, we provide a peep-hole having a disk of glass 26. The latter is suitably secured within a tubular collar or casing 27 which is passed through an aperture in the casing wall 10 and suitably flanged and welded to the casing wall. The baffle plate 25, it will be noted, has its eaves 38 extending outward beyond the limits of the flue 13 while at the same time the eaves are spaced some little distance inward from the vertical wall 10 of the casing. The inclined bottom 12 and the adjacent flue wall 13 together with the lower portion of the wall 10 form a peripheral collecting passage 27ª for receiving the condensing waters at the end of their downward course through the condenser. The passage 27ª is in direct communication with the suction outlet pipe 22 by which the condensing waters are carried off. The eaves of the baffle plate 24 are positioned so that drip from them will fall directly into the passage 27ª.

The short length of pipe 22 is provided with a flange 28 so that it may be connected to another pipe such as the pipe 29 having a flange 30. The two flanges 28 and 30 abut against each other and suitable bolts 31 and nuts 32 are used in securing the two flanges, and hence the two pipes, firmly together. These pipes constitute the suction outlet for the condenser.

Spaced above the central baffle plate 24 is a peripheral baffle plate 33. This plate is secured at its edges to brackets 34 by cap screws 35. In the present instance there are four such brackets and each is secured to the wall 10 by welding. In the preferred construction each bracket 34 is tapped for the associated cap screw 35, the interior of the tapped opening being suitably threaded for the cap screw thread. Preferably the plate 33 is merely apertured for the passage of the screw shank. In the center of this peripheral baffle plate 33 there is a large central opening 36. This opening is preferably circular and the edge 37 at the limit of the opening 36 lies toward the center from the eaves 38 of the central baffle plate 24.

In other words, the central opening is smaller in lateral dimensions than the central baffle plate 24. As a result any condensing liquid which passes over the circular edge 37 will fall upon the top of the plate 24 and then run down over its eaves 38 into the collecting passage 27ᵃ at the bottom of the condenser. Thus the baffle plates 24 and 33 constitute two cascading plates for the condensing water as it passes through the condenser.

In some installations it is desirable to connect the portion of the condenser space above the baffle plate 33 to a suction source such as a suction pump. To provide for such a connection the wall 10 of the condenser is apertured and provided with a connecting nipple 39 which is threaded on its interior for the reception of a pipe or for the reception of a closing plug 40.

In the upper part of the condenser is a spray plate 41. This plate has a central opening into which the lower end of a conical member 42 fits. The plate 41 and the lower end of the conical member 42 are secured together preferably by welding. The member 42 is of sufficient length to abut against a central flat portion 43 of the top 11. The connection between the upper end of the member 42 and the top 11 is also preferably provided by welding the metals together. Likewise the outer edge of the cover 11 is preferably secured to the upper surface of the spray plate 41 near its outer edge, by welding the parts together. The spray plate itself is of sufficient size to extend beyond the walls 10 so as to provide a flange engaging portion of sufficient width to cooperate with a peripheral flange 44 at the upper end of the casing wall 10. Suitable bolts 45, associated with nuts 46, pass through holes in the flange 44 and the outer portion of the spray plate 41 so as to secure the top 11 and the associated spray plate and member 42 to the cylindrical casing wall 10. From what has been stated, it will be seen that the cover 11, the spray wall 41 and the member 42 provide an annular condensing water chamber 47. It is supplied with the cooling condensing water through a supply pipe 48 which is fitted into an aperture in the top 11 so as to extend horizontally outward from the same. The line of meeting, designated 49, shows where the inner end of the pipe 48 is fastened to the top 11, the connection as before preferably being a welded connection.

The under surface of the spray plate 41 is provided with two series of spray devices 50, 51. Each of these devices is placed in communication with the space 47. This is accomplished by providing openings through the spray plate which are threaded on their interiors for the reception of the threaded shanks 52 of the devices. As a result of this construction cooling water which is supplied through pipe 48 to the space 47 passes into the spray devices 50, 51 and each spray device is provided with an aperture 53 through which the water is emitted in the form of a fine spray. This spray is directed downward within the upper portion of the condenser and comes in contact with the vapors which have been delivered from the vacuum pan or other vapor source. The particular spray devices illustrated need not be described in detail. They are fully disclosed in United States Patent No. 1,961,408, dated June 5, 1934.

In instances where it is needful to draw off the non-condensible vapors, it is desirable to provide an outlet pipe 54. This pipe may be variously connected to the interior of the condenser at a point adjacent to the spray devices, but it is preferably connected to the space provided at the top of the condenser within the member 42. In this instance, the pipe 54 passes through apertures in the top 11 and the member 42 and is suitably secured thereto by welding the materials together. The pipe 54 is also provided with a connecting flange 55 by which it may be coupled to another pipe leading to a suitable suction device.

In operation, the vapors rise up within the vacuum pan and pass through the receiving flue 13 into the interior of the condenser. At the same time cooling water, or other cooling liquid, is supplied through pipe 48 into the annular space 47 and thence through the spray devices 50, 51 into the interior of the condenser above the peripheral baffle plate 33. Thus, there will be a supply of vapor at the bottom and a supply of cooling liquid at the top. As the two meet in the chamber above the upper baffle plate the vapors will be condensed and the resulting mixture of cooling liquid and condensed vapors will pass downward and flow over the edge 37 of the peripheral plate 33 and strike upon the baffle plate 24 which serves as a roof for the flue 33 and thence over the eaves 38 of the latter into the lower collecting passage 27ᵃ about the flue 13 from which the same will be drawn off through the pipes 22 and 29.

When thus operating, it will be apparent that the incoming vapor stream passes through two cascading sheets of condensing water. The vapors first encounter a sheet of the condensing liquid flowing over the eaves 38. This will be in the form of a more or less continuous sheet. The incoming vapors will have to pass through this sheet and in this way will be largely condensed. Those vapors which succeed in passing through this first sheet of cascading liquid will then encounter a second sheet flowing over the edge 37 of the opening 36 in the baffle plate 33. Finally, any vapors which pass through this second sheet of condensing liquid will encounter the multitudinous sprays of the cooling liquid within the upper portion of the condenser, such sprays being provided by the devices 50 and 51. Then, in addition, all non-condensible vapors which pass through the path just outlined, will be collected within the conical member 42 and drawn out through the suction pipe 54.

In the arrangement of Fig. 4, the pipe 54 is connected through a pipe line 56, having a control valve 57, with a steam jet ejector 58. This ejector is connected to a suitable steam supply by a steam pipe 59 which is directed into an expansion chamber 60 through an expanding nozzle 61. Directly opposite the nozzle 61 is an outlet 62. The passage of the steam through the chamber 60 sucks the non-condensible vapors through the pipes 54 and 56 and discharges the same into atmosphere through the outlet 62. This steam ejector is one which in itself forms no part of the present invention. It is now available on the open market.

In the same arrangement, namely that of Fig. 4, the suction outlet through the pipes 22 and 29 is connected through a pipe 63 to the intake of a centrifugal pump 64, provided with suitable outlet piping 65 including a control valve 66. The piping 65 terminates in a vertical outlet pipe 67 which serves to discharge the collected liquids as waste, preferably into a sewer connection. In this arrangement the centrifugal pump 64 has an intake connection with a vertical pipe 68 which connects with a horizontal pipe 69 which in turn is threaded into the connecting nipple 39 near the upper end of the condenser wall 10. In making this connection, of course, the plug 40 is removed before the connection is made. The purpose of this connection is to maintain a suitable vacuum within the condenser. In the case of heavy condensation the suction pipe line connecting with the outlet pipe 22 might not be sufficient for this purpose. By the additional connection the vacuum will be properly maintained within the condenser.

In the arrangement of Fig. 4, the conical top 15 of the vacuum pan B is provided with a suitable man-hole having a cover 70. Likewise in this instance the upper part of the vacuum pan is connected by a suitable pipe line 71 to a tank 72 which supplies the liquid to be treated by the vacuum pan. In case the vacuum pan be employed in the treatment of milk, then the tank 72 may be a pasteurizer. The tank 72 is provided with suitable supporting legs such as the legs 73. Likewise the vacuum pan is provided with supporting legs 74. These rest, as does the pump 64, upon a suitable foundation 75. An outlet pipe connection 76 is employed at the bottom of the vacuum pan. In case the pan be used for the treating of milk then the pipe 76 might run to other equipment required in the further treatment of the milk. Obviously the vacuum pan itself may take different forms. An upright cylindrical pan is here shown.

The heating of the vacuum pan may be accomplished in any one of several different ways. There are many coil arrangements now on the market which would serve the purpose. Thus, heating coils like those shown in any of the following patents might be employed: 1,417,943, May 30, 1922, Rogers; 1,650,122, November 22, 1927, Grantzdorffer; 1,746,795, February 11, 1930, Rogers; 1,791,262, February 3, 1931, Baumann.

There are many arrangements of piping which might be employed with the condenser in addition to what is disclosed in Fig. 4. One other arrangement is disclosed. This is shown in Fig. 5. Here the suction pipe 22 is connected through pipe 29 to an elbow 76. The latter is connected to a suction pipe 77 which leads to a suitable pump such as a wet vacuum pump. As before, the liquid passing through the pipe will be discharged as waste. In this instance, the elbow 76 is connected by a pipe 78 to the center of the top of the condenser instead of to the pipe 54. In this instance the condenser is made up without the pipe 54 and the top is apertured for the reception of the end of the pipe 78. Thus the condenser A' in this figure is a modification of the condenser A, previously described.

The sheet material out of which the condenser and vacuum pan are made will be metal, and that metal should be chosen which will be best suited to the liquids to be treated. Thus, where milk is the liquid in question, the metal will preferably be stainless steel.

In the ordinary use of the equipment in the handling of milk, it will be necessary to clean out the vacuum pan very frequently. The manhole having the cover 70 is used for this purpose. It will be noted that the flue 13 opens out of the top of the vacuum pan. At the time the attendant is cleaning the vacuum pan he can also reach up into the flue and clean its interior. In addition to this, less frequent cleanings may be desirable. In such cases, the condenser may be removed from the vacuum pan and taken apart and thoroughly cleaned. The bolted construction shown enables this to be done without difficulty.

Obviously, in carrying out our invention many alterations and modifications may be made not only in the structure itself but in the piping arrangements, without departing from the spirit and scope of the invention. We therefore do not wish to be limited to the exact matter disclosed but aim to cover by the terms of the appended claims all those alterations and modifications which rightly come within the spirit and scope of our invention.

We claim:

1. In a condenser for treating vapors from vacuum pans and the like, a vertical cylindrical wall, a top having inclined conical walls, a central conical member providing a vertical passage, the upper end of said central member being secured to said top, a spray plate provided with a central aperture, said plate being connected at its outer edge to said cylindrical wall and at its inner edge to the bottom edge of said central conical member, the annular space formed by said spray plate and inner and outer conical walls constituting a condensing water chamber, a connection for supplying water to said chamber, and spraying devices connected to said spray plate and connecting with said chamber and operative to discharge a spray into the enclosure within said vertical wall.

2. In a condenser for treating vapors from vacuum pans and the like, a vertical cylindrical wall, a top having inclined conical walls, a central conical member providing a vertical passage, the upper end of said central member being secured to said top, a spray plate provided with a central aperture, said plate being connected at its outer edge to said cylindrical wall and at its inner edge to the bottom edge of said central conical member, the annular space formed by said spray plate and inner and outer conical walls constituting a condensing water chamber, a connection for supplying water to said chamber, spraying devices connected to said spray plate and connecting with said chamber and operative to discharge a spray into the enclosure within said vertical wall, and an outlet connection with said vertical passage through which non-condensible vapors may be withdrawn from said enclosure.

3. In a condenser for treating vapors from vacuum pans and the like, a vertical outer pan wall, an inclosing top providing limiting upper and outer walls of an inclosed space, a hollow member located within said top and forming the inner wall or walls of said inclosed space, a spray plate provided with an aperture registering with the interior of said hollow member and secured thereto so as to form the bottom wall of said space, said space constituting a condensing water chamber, a connection for supplying water to said chamber, and spraying devices connected to said spray plate and connecting with said chamber and operative to discharge a spray into the inclosure below said spray plate.

4. In a condenser for treating vapors from vacuum pans and the like, a vertical outer pan wall, an inclosing top providing limiting upper and outer walls of an inclosed space, a hollow member located within said top and forming the inner wall or walls of said inclosed space, a spray plate provided with an aperture registering with the interior of said hollow member and secured thereto so as to form the bottom wall of said space, said space constituting a condensing water chamber, a connection for supplying water to said chamber, spraying devices connected to said spray plate and connecting with said chamber and operative to discharge a spray into the inclosure below said spray plate, and an outlet connection communicating with the interior of said hollow member through which non-condensible vapors may be withdrawn from said inclosure.

5. The combination with a vacuum pan having a man-hole by which an attendant may enter the pan to clean the interior of the same, of a condenser comprising an enclosing casing, a vapor receiving flue communicating at one end with the interior of said pan and at its other end with the interior of said casing, a baffle plate near the condenser end of said flue, condensing spray devices, and condensate outlet means, said baffle plate and flue interior being within reach of the attendant in said pan so as to be cleaned, at least in part, by the attendant at the time he cleans the interior of the pan.

TIMOTHY MOJONNIER.
OLIVER W. MOJONNIER.